J. H. MUMMA.
Straw Cutter.
No. 1,648. Reissued March 29, 1864.
Fig. 1.
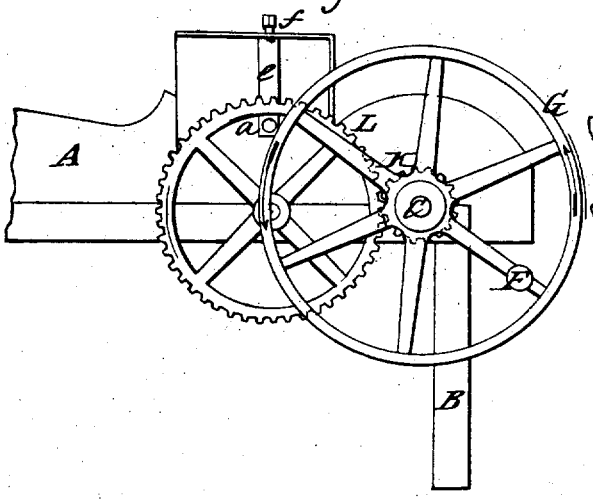
Fig.
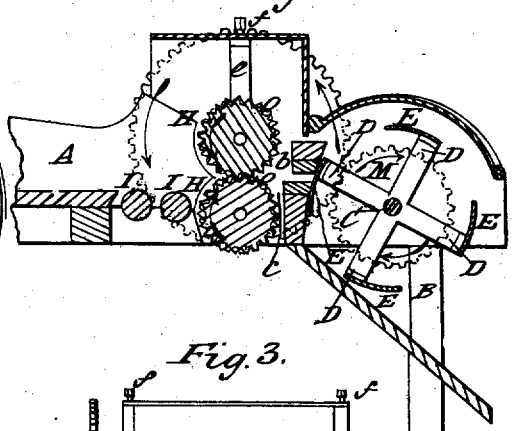
Fig. 3.
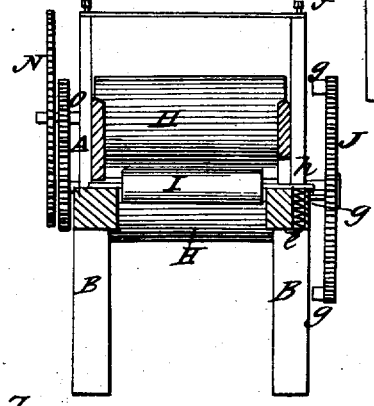
Fig. 5.
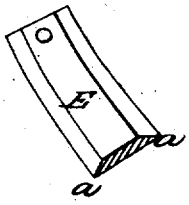
Fig. 4.
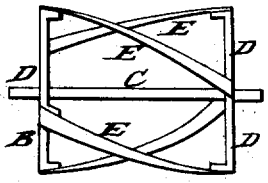
Fig. 6.
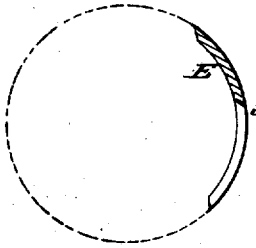
Fig. 7.
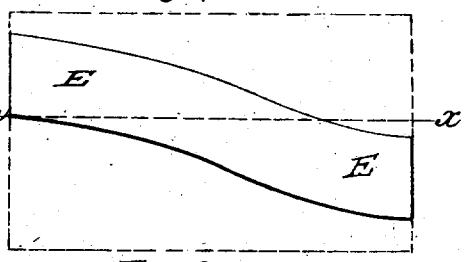
Fig. 8.
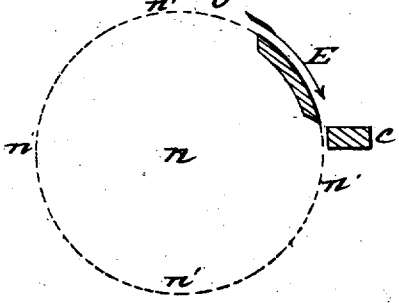
Witnesses:
R. F. Campbell
C. Schofield
Inventor:
Jacob H. Mumma
by his Atty
Marcus Fenwick Lemmon
N. PETERS, Photo-Lithographer, Washington, D. C.

UNITED STATES PATENT OFFICE.

H. K. PARSONS, OF HARRISBURG, PENNSYLVANIA, ASSIGNEE, BY MESNE ASSIGNMENT, OF JACOB H. MUMMA.

STRAW-CUTTER.

Specification forming part of Letters Patent No. 19,200, dated January 26, 1858; Reissue No. 808, dated September 6, 1859; Reissue No. 1,648, dated March 29, 1864.

*To all whom it may concern:*

Be it known that I, H. K. PARSONS, of Harrisburg, Dauphin county, State of Pennsylvania, have, by assignment duly recorded in the Patent Office, become the sole owner of a patent granted to JACOB H. MUMMA, January 26, 1858, for Improvements in Straw-Cutters, of which said MUMMA is the inventor; and I do hereby declare that the following is a full, clear, and exact description thereof, reference being had to the accompanying drawings, making a part of this specification, in which—

Figure 1 is an elevation of one side of the machine. Fig. 2 is a longitudinal vertical section through the machine. Fig. 3 represents a vertical transverse section taken behind the feed-rollers. Figs. 4, 5, 6, 7, and 8 represent in detail the form of cutters and the arrangement of the same upon their cylinder or heads.

Similar letters of reference indicate corresponding parts in the several parts.

The object of my invention is to construct rotary knives or knife-blades for cutting fodder in such manner that they will not lose their cut by resharpening, and thus reducing their width, however unskillful it may be done, nor require to be readjusted in any manner whatever to preserve a uniformity of cut after they are once properly seated on their cylinder-heads.

By my invention the construction of spiral knives is reduced to a system, and knives may thus be made according to patterns adapted to suit cylinders or cylinder-heads of different diameters, and when bolted to the peripheries of such heads the convex surface of each knife will be concentric with the axis of these heads, and hence their cutting-edges will always touch or clear the same straight line or "cutter-bar," however irregular they may become by wear or breakage, as will be hereinafter described.

My invention also has for its object the construction of reversible spiral knives, which, while they are capable of being reversed or turned end for end on their heads or holders, and thus made to last double the length of time of a single cutting-edge knife, by once sharpening, they are also so formed and applied to their cylinder heads or holders that the distance of their cutting-edges from their axis of motion will not be changed by sharpening or reducing their width, as will be hereinafter described.

To enable others skilled in the art to make and use my invention, I will describe its construction and operation.

A represents the cutting-box, arranged on supports B. C is a shaft, upon which are fitted the heads or radial arms D, to which the knives E are affixed, and this shaft C revolves in suitable bearings on the frame of the machine, and may be turned by the handle F on the fly-wheel G. The knives or cutters E are of a spiral form, and have both of their edges ground down to a cutting-edge, as shown at *a a* in Fig. 5. The object of this form of knife and its operation will be more particularly described hereinafter. The knives of course are attached to their supports by means of screws or other devices which will admit of ready removal therefrom for any purpose.

H H are a pair of crushing-rolls, between which the material passes before it reaches the cutters. These rolls are geared together by star gear-wheels *o o*, so that one (the upper one) may yield and move from and to the other without getting out of gear therewith. The boxes or bearings *d* of the elastic roll are held down by rubber springs *e*, and the resistance of these springs is adjusted by set-screws *f*. I find the india-rubber springs far preferable to metal springs, the former being not only cheaper and less liable to injury, but better in all respects than metal springs.

I I′ are feed-rolls, the one, I, being held down by a spring, *i*, so that it may receive a sudden jar or motion, for the purpose of shaking the dirt and grit out of the straw. This roll I is acted on as follows: On the wheel J there are tappets, *g g*, Fig. 3, which catch under the journal *h* of said roll and raise it up against the action of the spring *i*, and when the tappets slip off from the journal said spring suddenly brings the roller to its place, which shakes the straw and cleans it of all grit, which would otherwise dull the knives. The roll I′ turns in fixed bearings.

K L are gear-wheels for communicating motion from the fly-wheel shaft to the feeding and crushing cylinders I I′ and H H, and though the latter are called "crushing-cylinders," yet they act as feed-rolls; also, the feed-rolls I I′ are not driven by a positive motion, but may be so driven. They turn simply by the friction of the passing straw or stalks that are being drawn through.

It is immaterial which one of the rolls I I′ receives the jar or shake, or which one of the crushing-rolls is held or acted upon by the gum springs. The effect will be the same in each case.

M N are the gears that are used when the knives cut upward against the cutter-bar *b*, and K L the gears which are used when the machine is cutting downward. When the machine cuts upward, the wheels M N are in gear with one another and the wheels L L must be thrown out of gear with one another, and vice versa, when the machine cuts downward. These changes are made by slipping one or the other of each pair of gears on their respective shafts. Thus the machine through its gearing will operate twice as long at one sharpening. It also possesses this advantage if only one set of gears is used, as the reversing of the knives alone doubles the working capacity of the machine without regrinding the knives.

The red arrows in Fig. 1 show the arrangement for cutting down upon the cutter bar or bed, *c*, and the blue arrows in Fig. 2 for cutting upward against bar *b*.

Having thus described the general construction of my machine, I will now proceed to describe more particularly those parts which constitute the essential features of my invention and improvement.

In Figs. 4, 5, 6, 7, and 8, I have shown clearly the construction of the knives or knife-blades which I use in the machine above described. These knives are all lettered E, and they cut against a straight-edge cutter-bar, the edge of which is parallel to the axis of motion of the knives, and is represented by the red line *x x*, Fig. 7, and letter *c*, Fig. 8. The outer surface of each knife, taken at any point from one end to the other, is the arc of a circle concentric with the axis of the cylinder or radial arms to which the knives are affixed. Let *n*, Fig. 8, be the axis or center of the circle *n′*, and E be a knife revolving around this axis *n*, the cutting-edges of which knife are obtained by beveling a spiral strip of metal from the inner surface outward, as shown at *a a*. It will be seen that if the outer or convex surface of the knife E is concentric with the axis *n* and the segment of a circle, *n′*, the cutting-edge will always touch a straight and fixed line, *x x*, in the revolution of the knife about the center *n*, however narrow the knife may be reduced by grinding, or however irregular and imperfect its edge may be ground; but if the edge of this knife be sharpened by chamfering it from its outer surface inward, the cutting-edge will be on the inner side the distance of its thickness from the fixed cutter-bar *c*; hence by my arrangement and form of spiral knife the beveling must always be from the concave surface outward, and whatever may be the acuteness of the angle or the form of the cutting-edge, this edge will always touch or clear the straight edge of the cutter-bar if the knife is fixed to the peripheries of the circular heads or arms D.

By thus arranging a knife or knives upon the circular heads, the necessity for adjusting it outward or toward the cutter-bar every time it is sharpened is avoided, and a constant unvarying set is obtained after the parts are once adjusted in position; but, on the other hand, if the outer surface of the knife, whether convex or straight, be set tangentially to the cylinder heads or arms or the circular path *n′*, every reduction of the edge of the knife by grinding will increase the distance of this edge from the cutter-bar, and every irregularity or nick in the cutting-edge will seriously impair the efficiency of the knife. The edges of such knives are more liable to become nicked or notched than knives whose outer surfaces are concentric with the axis about which they revolve, as there is less support in the former than in the latter, and I wish it to be distinctly understood that however slightly a knife may deviate from the true position herein described, all the objections urged against tangentially-set knives will exist.

The knives E, which I have represented in the drawings, have double cutting-edges—*i. e.*, the blades are made so that they can be reversed or turned end for end on their cylinders or drum heads, and thus a new or fresh cutting-edge can be brought into action when one edge becomes dull. But I do not limit my invention to a spiral knife having double cutting-edges, as it is obvious that I am enabled to carry my invention into effect by a blade formed as described, with a single cutting-edge or a cutting-edge on one side of the blade.

The peculiar form and the concentricity of my knives when arranged upon their cylinder heads or arms enable me to practically employ a knife with double cutting-edges which can be made available by reversing the knife on its bearings, as above stated.

From the above description it will be seen that in order to carry out my invention the knives should be constructed with reference to the diameters of the cylinder heads to which they are to be applied, for in each case all the knives should form spiral segments of a cylinder which would be described by their edges in revolving the knives around an axis, the outer surfaces of all the knives being concentric with said axis. Otherwise it would be necessary to set the knives more or less tangentially to their axis of motion, which would involve the necessity of adjusting them nearer to the cutter-bar every time that their edges were sharpened—a practice common to the use of all rotating knives for straw-cutters hitherto used.

I do not lay claim, broadly, to spiral knives arranged around an axis and secured to radial arms or to circular heads in such positions as to require resetting, or setting farther from their axis, to compensate for the reduction of their width, which is necessary to keep their edges sharp; nor do I claim, broadly, an adjustable spiral knife having its cutting-edge formed by beveling or grinding its under or inner edge; but What I do claim as new, and desire to secure by Letters Patent, is—

1. A knife constructed in the form of a spiral segment of a cylinder, and so that when it is applied to supports, heads, arms, or holders, its entire outer surface will, if intersected transversely at any point, form the arc or segment of a circle concentric with the axis about which it revolves, in contradistinction to a tangentially-arranged knife and other knives which in being sharpened are reduced so as no longer to cut in the same path or circle, substantially as described.

2. A reversible spiral knife with two under-beveled cutting-edges, and constructed with its outer surface concentric with its axis of motion, and adapted for use substantially as described.

3. The combined application to straw-cutting machines of a changeable feed-gear with two-edged revolving cutters or blades, when so made that they shall bring a different cutting-edge into action, or when run in either direction they shall always feed in the material in one and the same direction, substantially as and for the purpose stated.

4. The combination of the feed-rollers acted upon by tappets, and the crushing-rolls controlled by gum-elastic springs, when arranged in relation to and acting in connection with the cutting apparatus, as herein described.

H. K. PARSONS.

Witnesses:
KIRK HAINES,
LE ROY PARSONS.